US009608490B2

(12) United States Patent
Aota et al.

(10) Patent No.: US 9,608,490 B2
(45) Date of Patent: Mar. 28, 2017

(54) COMPRESSOR

(71) Applicant: DAIKIN INDUSTRIES, LTD., Osaka-shi, Osaka (JP)

(72) Inventors: Keiji Aota, Kusatsu (JP); Akinobu Ishizaki, Kusatsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 15/100,576

(22) PCT Filed: Dec. 2, 2014

(86) PCT No.: PCT/JP2014/081838
§ 371 (c)(1),
(2) Date: May 31, 2016

(87) PCT Pub. No.: WO2015/083687
PCT Pub. Date: Jun. 11, 2015

(65) Prior Publication Data
US 2016/0315517 A1    Oct. 27, 2016

(30) Foreign Application Priority Data

Dec. 2, 2013 (JP) ................................. 2013-249160

(51) Int. Cl.
*H02K 3/50* (2006.01)
*H02K 3/34* (2006.01)
(Continued)

(52) U.S. Cl.
CPC ............ *H02K 3/345* (2013.01); *F04C 18/00* (2013.01); *F04C 29/0057* (2013.01);
(Continued)

(58) Field of Classification Search
CPC .................................. H02K 3/38; H02K 3/52
See application file for complete search history.

(56) References Cited

U.S. PATENT DOCUMENTS

| | | | |
|---|---|---|---|
| 6,445,095 B1 * | 9/2002 | Liang | H02K 9/22 310/216.045 |
| 6,583,532 B2 * | 6/2003 | Hein | H02K 9/22 310/260 |
| 9,178,398 B2 * | 11/2015 | Saitou | H02K 3/50 |

FOREIGN PATENT DOCUMENTS

| | | |
|---|---|---|
| JP | 5-146106 A | 6/1993 |
| JP | 11-178264 A | 7/1999 |

(Continued)

OTHER PUBLICATIONS

International Search Report of corresponding PCT Application No. PCT/JP2014/081838 dated Feb. 3, 2015.
(Continued)

*Primary Examiner* — Dang Le
(74) *Attorney, Agent, or Firm* — Global IP Counselors

(57) ABSTRACT

A compressor includes a casing, a compression mechanism arranged inside the casing, a motor arranged inside the casing, and an insulation sheet. The motor drives the compression mechanism. The motor is a concentrated-winding motor having a stator that has a plurality of teeth, and an insulator adjacent to the stator, with windings wound about the teeth with the insulator interposed between the windings and the teeth. The insulation sheet is arranged between the casing and crossover wires of the windings.

5 Claims, 13 Drawing Sheets

(51) Int. Cl.
*H02K 3/38* (2006.01)
*H02K 3/52* (2006.01)
*H02K 7/14* (2006.01)
*F04C 18/00* (2006.01)
*F04C 29/00* (2006.01)
*H02K 3/32* (2006.01)

(52) U.S. Cl.
CPC ............ *F04C 29/0085* (2013.01); *H02K 3/38* (2013.01); *H02K 3/522* (2013.01); *H02K 7/14* (2013.01); *F04C 2210/26* (2013.01); *F04C 2230/231* (2013.01); *F04C 2240/30* (2013.01); *F04C 2240/40* (2013.01); *H02K 3/325* (2013.01); *H02K 2203/06* (2013.01)

(56) References Cited

FOREIGN PATENT DOCUMENTS

| | | | |
|---|---|---|---|
| JP | 2002-44892 | A | 2/2002 |
| JP | 2009-77477 | A | 4/2009 |
| JP | 2009-240119 | A | 10/2009 |
| JP | 5831533 | B2 | 6/2015 |

OTHER PUBLICATIONS

International Preliminary Report of corresponding PCT Application No. PCT/JP2014/081838 dated Jun. 16, 2016.
European Search Report of corresponding EP Application No. 14 86 8338.6 dated Jan. 5, 2017.

* cited by examiner

COMPRESSOR

CROSS-REFERENCE TO RELATED APPLICATIONS

This U.S. National stage application claims priority under 35 U.S.C. §119(a) to Japanese Patent Application No. 2013-249160, filed in Japan on Dec. 2, 2013, the en contents of which are hereby incorporated herein by reference.

TECHNICAL FIELD

The present invention relates to a compressor.

BACKGROUND ART

Compressors comprising concentrated-winding motors have been made increasingly more compact in the prior art. However, it is necessary for an insulation distance, which is the distance between crossover wires of windings of the motor and a casing of a compressor, to satisfy legal standards. Therefore, in cases when the thickness of a back yoke, which is a toric portion on an outer side of a stator of the motor, is reduced, it is difficult to make the compressor more compact while ensuring the efficiency of the motor.

SUMMARY

Technical Problem

Methods other than those for reducing the insulation distance to make the compressor more compact have been used. Japanese Laid-open Patent Application No. 2002-44892 discloses a compressor in which crossover wires are arranged above a coil of a motor, the crossover wires being secured to the motor by a binding cord or the like. However, such compressors tend to entail numerous production steps and high production cost. Japanese Laid-open Patent Application No. H05-146106 discloses a compressor in which crossover wires are arranged above a coil of a motor, the coil and the crossover wires being stabilized with a resin and secured to the motor. However, in such a compressor, the temperature of the resin readily rises during operation, which tends to adversely impact performance of the compressor.

The purpose of the present invention is to provide a compressor that can be made more compact while ensuring the efficiency of a motor.

Solution to Problem

A compressor according to a first aspect of the present invention comprises a casing, a compression mechanism, and a motor. The compression mechanism is arranged inside the casing. The motor is arranged inside the casing, and drives the compression mechanism. The motor has a stator having a plurality of teeth, and an insulator adjacent to the stator. The motor is a concentrated-winding motor in which windings are wound about the teeth with the insulator interposed therebetween. An insulation sheet is arranged between the casing and crossover wires of the windings.

This compressor comprises a concentrated-winding motor. In the concentrated-winding motor, windings of coils are connected via crossover wires. An insulation sheet made of a resin film or the like is arranged between the crossover wires and the casing. The crossover wires and the casing are insulated from each other by the insulation sheet. Arranging the insulation sheet makes it possible to reduce the thickness of a back yoke, which is a toric portion on the outer side of the stator of the motor, without reducing the efficiency of the motor. Accordingly, the compressor according to the first aspect of the present invention can be made more compact while ensuring the efficiency of the motor.

A compressor according to a second aspect of the present invention is the compressor according to the first aspect, wherein the insulation sheet is tubular in shape and is arranged between the insulator and the casing.

In this compressor, the insulation sheet is tubular in shape. The tubular insulation sheet can be arranged by insertion into a gap between the insulator and the casing. Accordingly, since the insulation sheet is readily arranged, the compressor according to the second aspect of the present invention can be made more compact simply.

A compressor according to a third aspect of the present invention is the compressor according to the second aspect, wherein the insulation sheet has tabs sandwiched between the stator and the insulator.

In this compressor, the insulation sheet is tubular in shape, and has tabs protruding from a lower end of the tubular shape. Inserting the tabs of the insulation sheet between the stator and the insulator makes it possible to secure the insulation sheet to the motor. Accordingly, in the compressor according to the third aspect of the present invention, the insulation sheet can readily be secured to the motor.

A compressor according to a fourth aspect of the present invention is the compressor according to the second or third aspect, wherein the insulation sheet is molded from a heat-shrinkable material.

In this compressor, the insulation sheet is tubular in shape, and is molded from a material that shrinks under heating. Heating and shrinking the tubular insulation sheet after arranging the insulation sheet by insertion into the gap between the insulator and the casing makes it possible to bond the insulation sheet to the insulator. Accordingly, in the compressor according to the fourth aspect of the present invention, the insulation sheet can readily be secured to the motor.

A compressor according to a fifth aspect of the present invention is the compressor according to the first aspect, wherein the insulation sheet is arranged between the insulator and the casing. The insulation sheet has an annular part sandwiched between the stator and the insulator across the entire circumference of the stator.

In this compressor, the insulation sheet has, e.g., an annular part and projecting parts protruding outward from the annular part. Inserting the annular part of the insulation sheet between the stator and the insulator makes it possible to secure the insulation sheet to the motor. The projecting parts are positioned between the crossover wires and the casing. Accordingly, in the compressor according to the fifth aspect of the present invention, the insulation sheet can readily be secured to the motor.

A compressor according to a sixth aspect of the present invention is the compressor according to any of the first through fifth aspects, wherein the insulator has a protruding part protruding toward the casing. The insulation sheet is arranged between the insulator and the casing, and also between the stator and the protruding part.

In this compressor, the insulation sheet is positioned between the insulator and the casing. The insulation sheet is positioned below the protruding part of the insulator and above an upper-end surface of the stator. The protruding part of the insulator prevents the insulation sheet from falling out of the gap between the insulator and the casing. Accordingly, in the compressor according to the sixth aspect of the present invention, it is possible to prevent the insulation sheet from separating from the motor.

A compressor according to a seventh aspect of the present invention is the compressor according to any one of the first through fifth aspects, wherein the compressor further comprises a sheet-securing member arranged between the insulator and the casing. The insulation sheet is arranged between the insulator and the casing, and also between the stator and the sheet-securing member.

In this compressor, the insulation sheet is positioned between the insulator and the casing. The insulation sheet is positioned below the sheet-securing member and above an upper-end surface of the stator. The sheet-securing member prevents the insulation sheet from falling out of the gap between the insulator and the casing. Accordingly, in the compressor according to the seventh aspect of the present invention, it is possible to prevent the insulation sheet from separating from the motor.

Advantageous Effects of Invention

The compressor according to the first aspect can be made more compact while ensuring the efficiency of the motor.

The compressor according to the second aspect can be made more compact simply.

In the compressor according to the third through fifth aspects, the insulation sheet can readily be secured to the motor.

In the compressor according to the sixth and seventh aspects it is possible to prevent the insulation sheet from separating from the motor.

DESCRIPTION OF EMBODIMENTS

A compressor according to an embodiment of the present invention is described with reference to the drawings. The compressor according to the present embodiment is a rotary compressor. The rotary compressor is a compressor in which a piston is caused to rotate eccentrically inside a cylinder, and the volume of the space inside the cylinder is caused to vary, whereby a refrigerant circulating in a refrigerant circuit is compressed.

(1) Configuration of Compressor

Figure 1:
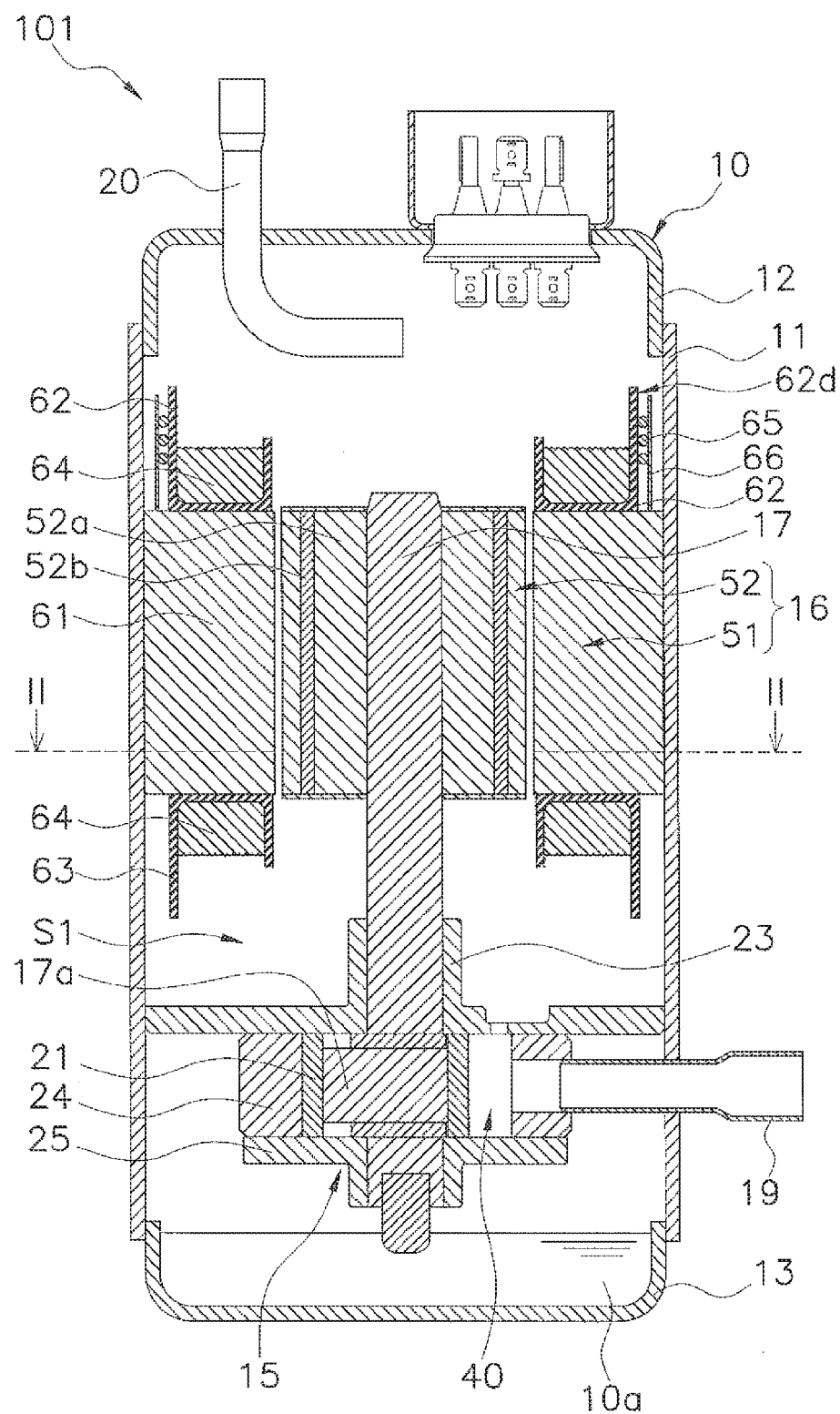
FIG. 1 is a longitudinal cross-sectional view of a rotary compressor according to an embodiment.

FIG. 1 is a longitudinal cross-sectional view of a rotary compressor 101 according to the present embodiment. The rotary compressor 101 primarily comprises a casing 10, a compression mechanism 15, a drive motor 16, a crankshaft 17, an intake tube 19, and a discharge tube 20. Each of the constitutional elements of the rotary compressor 101 is described below.

(1-1) Casing

The casing 10 has a substantially tubular barrel casing part 11, a bowl-shaped upper wall part 12 hermetically welded to an upper-end part of the barrel casing part 11, and a bowl-shaped bottom wall part 13 hermetically welded to a lower-end part of the barrel casing part 11. The casing 10 is molded from a rigid material that does not readily deform or break when the pressure and temperature on the inner part and outer part of the casing 10 change. The casing 10 is arranged such that the axial direction of the substantially tubular shape of the barrel casing part 11 runs vertically. The bottom part of the casing 10 is provided with an oil reservoir part 10a in which a lubricating oil is accumulated. The lubricating oil is a refrigerating oil used in order to lubricate sliding parts inside the rotary compressor 101.

The casing 10 primarily accommodates a compression mechanism 15, a drive motor 16 disposed above the compression mechanism 15, and a crankshaft 17 disposed along the vertical direction. The compression mechanism 15 and the drive motor 16 are linked via the crankshaft 17. The intake tube 19 and the discharge tube 20 are hermetically joined to the casing 10.

(1-2) Compression Mechanism

The compression mechanism 15 is primarily configured from a front head 23, a cylinder 24, a rear head 25, and a piston 21. The front head 23, the cylinder 24, and the rear head 25 are integrally fastened by laser welding. The space above the compression mechanism 15 is a high-pressure space S1 into which refrigerant compressed by the compression mechanism 15 is discharged.

The compression mechanism 15 has a compression chamber 40, which is a space surrounded by the front head 23, the cylinder 24, and the rear head 25. The compression chamber 40 is partitioned by the piston 21 into an intake chamber communicating with the intake tube 19 and a discharge chamber communicating with the high-pressure space S1.

The piston 21 is fitted onto an eccentric shaft part 17a of the crankshaft 17. Due to axial rotation of the crankshaft 17, the piston 21 performs an orbiting motion in the compression chamber 40 about the rotational axis of the crankshaft 17. The orbiting motion of the piston 21 causes the volumes of the intake chamber and discharge chamber constituting the compression chamber 40 to vary.

(1-3) Drive Motor

The drive motor 16 is a brushless DC motor accommodated inside the casing 10 and arranged above the compression mechanism 15. The drive motor 16 is primarily configured from a stator 51 secured to an inner peripheral surface of the casing 10, and a rotor 52 rotatably accommodated on the inner side of the stator 51 with an air gap provided therebetween. The drive motor 16 is a three-phase motor having six concentrated-winding coils, and furthermore is an adjustable-speed motor driven by an inverter control. The configuration of the drive motor 16 is described in detail later.

(1-4) Crankshaft

The crankshaft 17 is disposed such that the central axis thereof runs vertically. The crankshaft 17 has an eccentric shaft part 17a. The eccentric shaft part 17a of the crankshaft 17 is linked to the piston 21 of the compression mechanism 15. The end part on the vertical-direction upper side of the crankshaft 17 is linked to the rotor 52 of the drive motor 16. The crankshaft 17 is rotatably supported by the front head 23 and the rear head 25.

(1-5) Intake Tube

The intake tube 19 passes through the barrel casing part 11 of the casing 10. The end part of the intake tube 19 that is inside the casing 10 is fitted into the compression mechanism 15. The end part of the intake tube 19 that is outside the casing 10 is connected to the refrigerant circuit. The intake tube 19 is a tube for supplying refrigerant from the refrigerant circuit to the compression mechanism 15.

(1-6) Discharge Tube

The discharge tube 20 passes through the upper wall part 12 of the casing 10. The end part of the discharge tube 20 that is inside the casing 10 is positioned above the drive motor 16 in the high-pressure space S1. The end part of the discharge tube 20 that is outside the casing 10 is connected to the refrigerant circuit. The discharge tube 20 is a tube for supplying refrigerant compressed by the compression mechanism 15 to the refrigerant circuit.

(2) Configuration of Drive Motor

Figure 2:
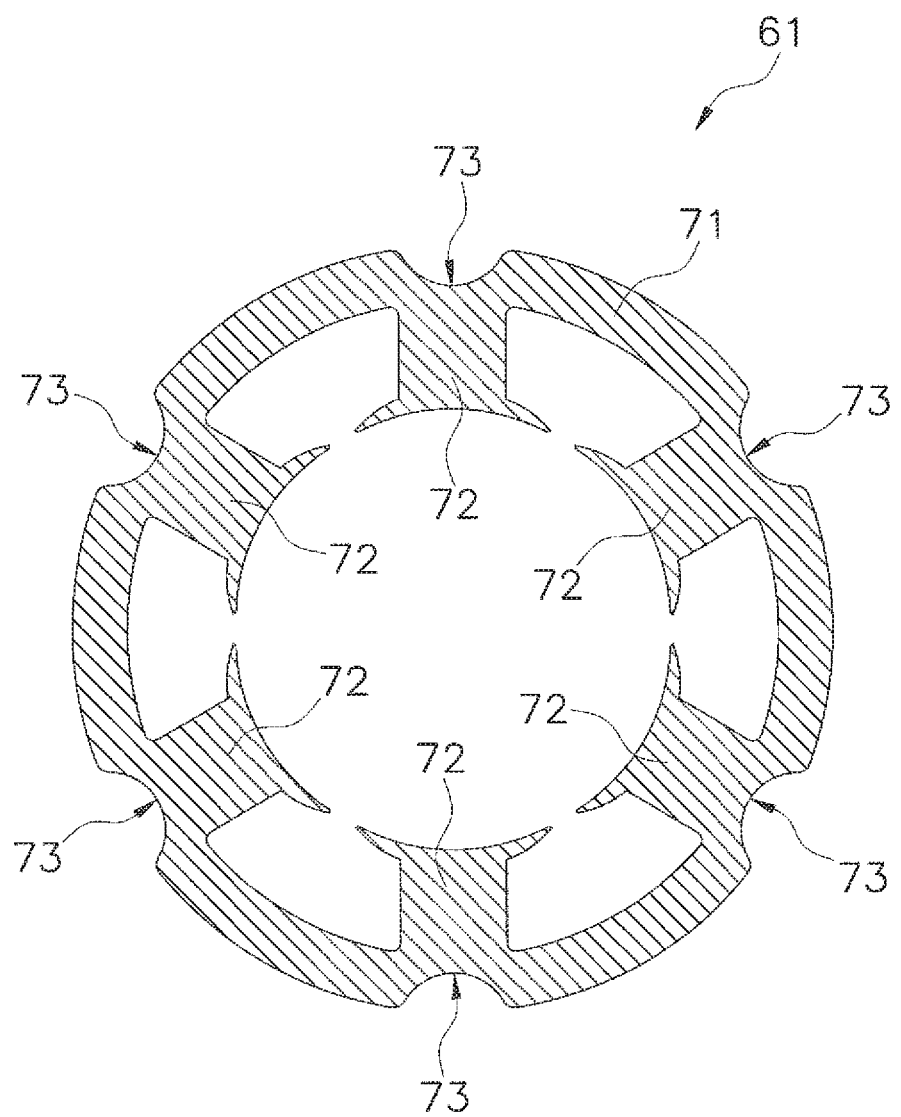
FIG. 2 is a cross-sectional view of a stator, taken along line segment II-II in FIG. 1.
Figure 3:
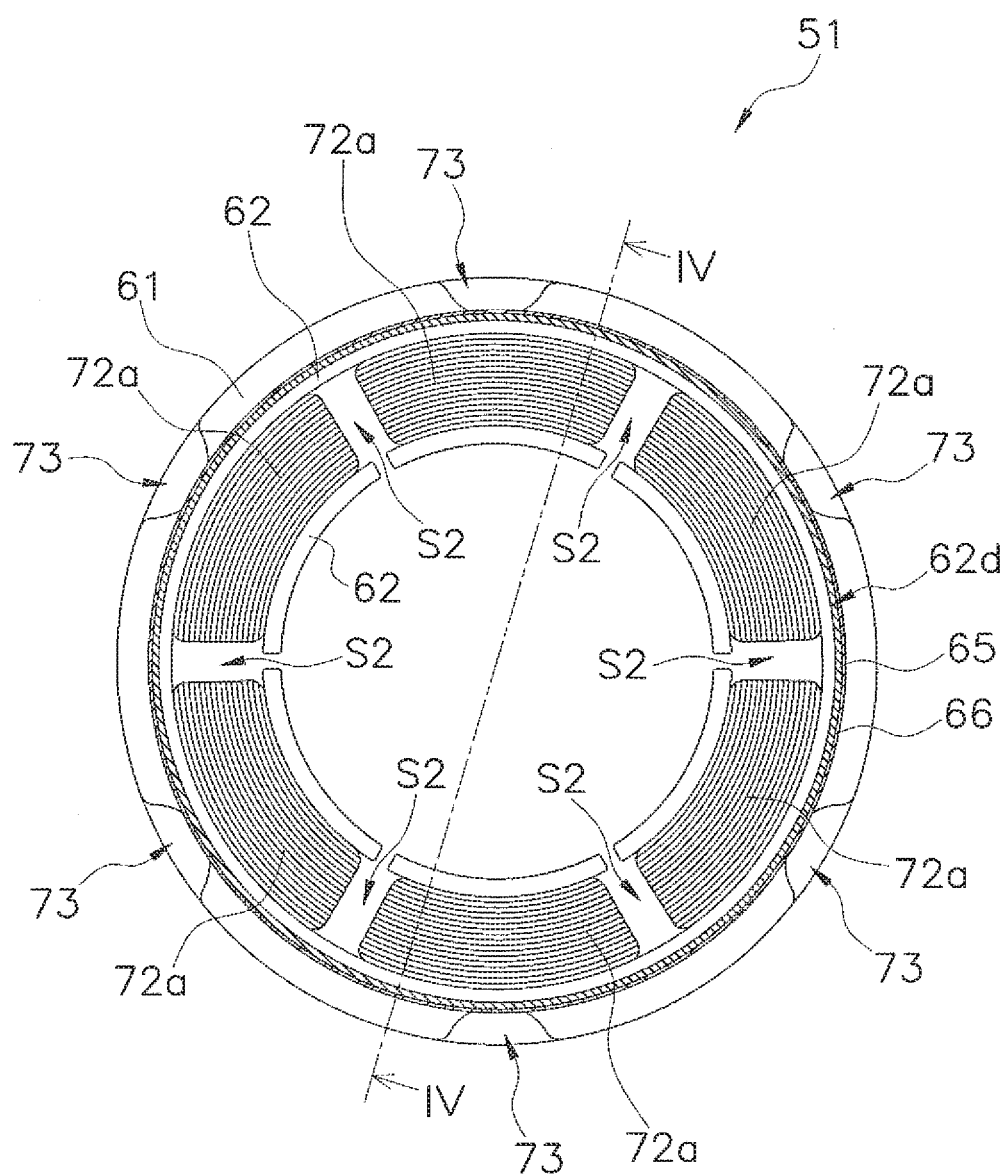
FIG. 3 is a top view of a stator of a drive motor.
Figure 4:
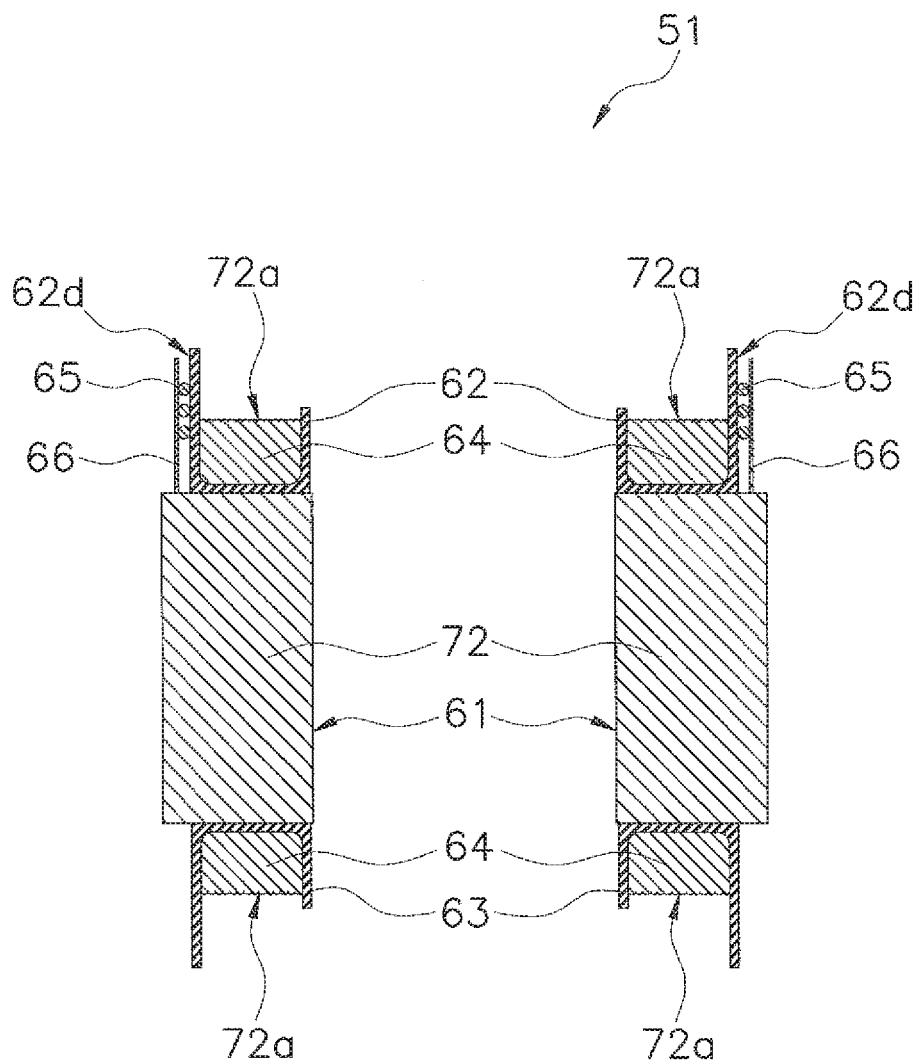
FIG. 4 is a cross-sectional view taken along line segment IV-IV in FIG. 3.

The configuration of the drive motor 16 is described in detail here. FIG. 2 is a cross-sectional view of the stator 51, taken along line segment II-II in FIG. 1. FIG. 3 is a top view of the stator 51 of the drive motor 16. FIG. 4 is a cross-sectional view, taken along line segment IV-IV in FIG. 3.

(2-1) Stator

The stator 51 has a stator core 61, and a pair of insulators 62, 63 attached to the two vertical-direction end surfaces of the stator core 61, as shown in FIG. 4. The insulator 62 is attached to the upper-side end surface of the stator core 61, and the insulator 63 is attached to the lower-side end surface of the stator core 61.

(2-1-1) Stator Core

The stator core 61 is secured to the casing 10. Specifically, the outer peripheral surface of the stator core 61 is welded to the inner peripheral surface of the casing 10. Three weld locations are provided to each of the two vertical-direction end parts of the stator core 61. The weld locations may be suitably determined in accordance with the weight and natural frequency of the stator core 61, and other such factors. The stator core 61 may be secured to the casing 10 by press-fitting and shrink-fitting.

The stator core 61 has a tubular part 71, and six teeth 72, as shown in FIG. 2. Each of the teeth 72 protrudes from the inner peripheral surface of the tubular part 71 radially inward from the tubular part 71. The radial direction of the tubular part 71 falls within a horizontal plane orthogonal to the vertical direction. The six teeth 72 are disposed at equal intervals along a circumferential direction of the tubular part 71. The six teeth 72 are disposed at positions having six-fold symmetry about a central axis of the tubular part 71.

Six core cuts 73 are formed in the outer peripheral surface of the tubular part 71 of the stator core 61, as shown in FIG. 2. Each of the core cuts 73 is a groove forming a cutout along the central axis of the tubular part 71, from an upper-end surface of the tubular part 71 to a lower-end surface of the tubular part 71. Each of the core cuts 73 is positioned radially outside the tubular part 71, as viewed from the teeth 72. The six core cuts 73 are disposed at equal intervals along the circumferential direction of the tubular part 71. The six core cuts 73 are disposed at positions having six-fold symmetry about the central axis of the tubular part 71.

Conducting wires are wound about the teeth 72 of the stator core 61, as well as the insulator 62, as shown in FIGS. 3 and 4. A coil 72a is thereby formed on each of the teeth 72 of the stator core 61. The conducting wires wound about the teeth 72 and the insulator 62 are referred to below as "windings 64." The windings 64 are wound separately about each of the teeth 72. Specifically, the coils 72a are concentrated-winding coils. As shown in FIG. 3, the windings 64 of each of the teeth 72 are connected to each other via cross-over wires 65. Inter-coil spaces S2 are formed between every two adjacent coils 72a. Windings (not shown) corresponding to neutral points of the coils 72a are accommodated in insulation caps, and are inserted into the inter-coil spaces S2, which are the spaces between every two adjacent coils 72a.

(2-1-2) Insulator

Figure 5:
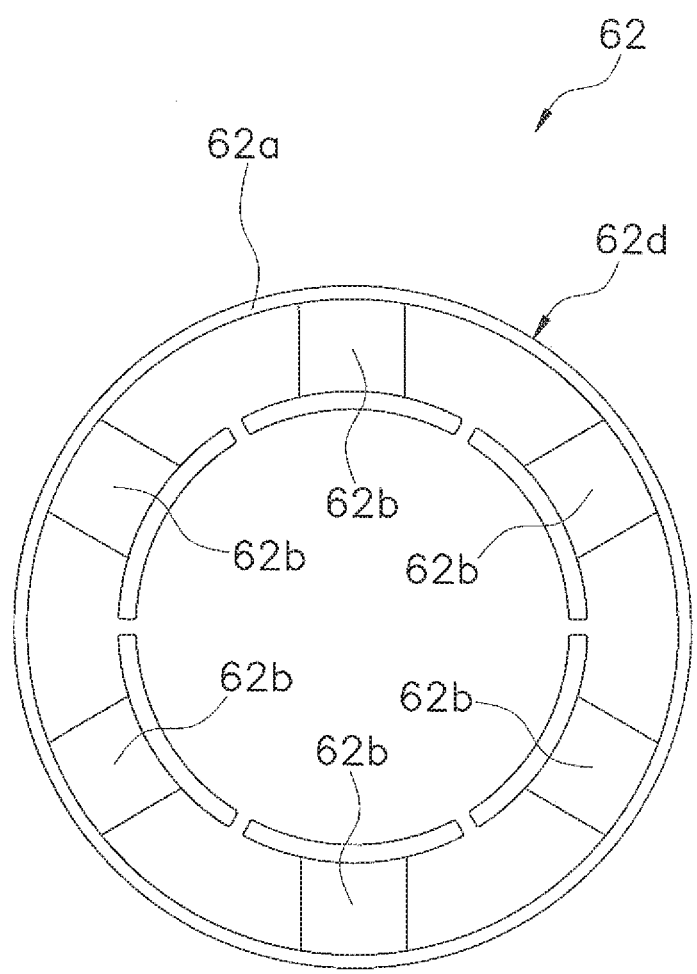
FIG. 5 is a top view of an insulator.

FIG. 5 is a top view of the insulator 62 attached to the upper-side end surface of the stator coil 61. The insulator 62 is an insulating body attached to the two vertical-direction end surfaces of the stator coil 61. The insulator 62 is molded from, e.g., a liquid crystal polymer (LCP), polybutylene terephthalate (PBT), polyphenylene sulfide (PPS), a polyimide, a polyester, or another highly heat-resistant resin.

The insulator 62 has an annular part 62a and six projecting parts 62b, as shown in FIG. 5. The annular part 62a is in contact with the upper-end surface of the tubular part 71 of the stator core 61. The projecting parts 62b protrude from an inner peripheral surface of the annular part 62a radially inward from the annular part 62a. Each of the projecting parts 62b is in contact with the upper-end surface of the teeth 72 of the stator core 61. The insulator 62 insulates the stator core 61 and the windings 64 of the coils 72a. The description given above can also be applied to the insulator 63 attached to the lower-side end surface of the stator core 61.

Figure 6:
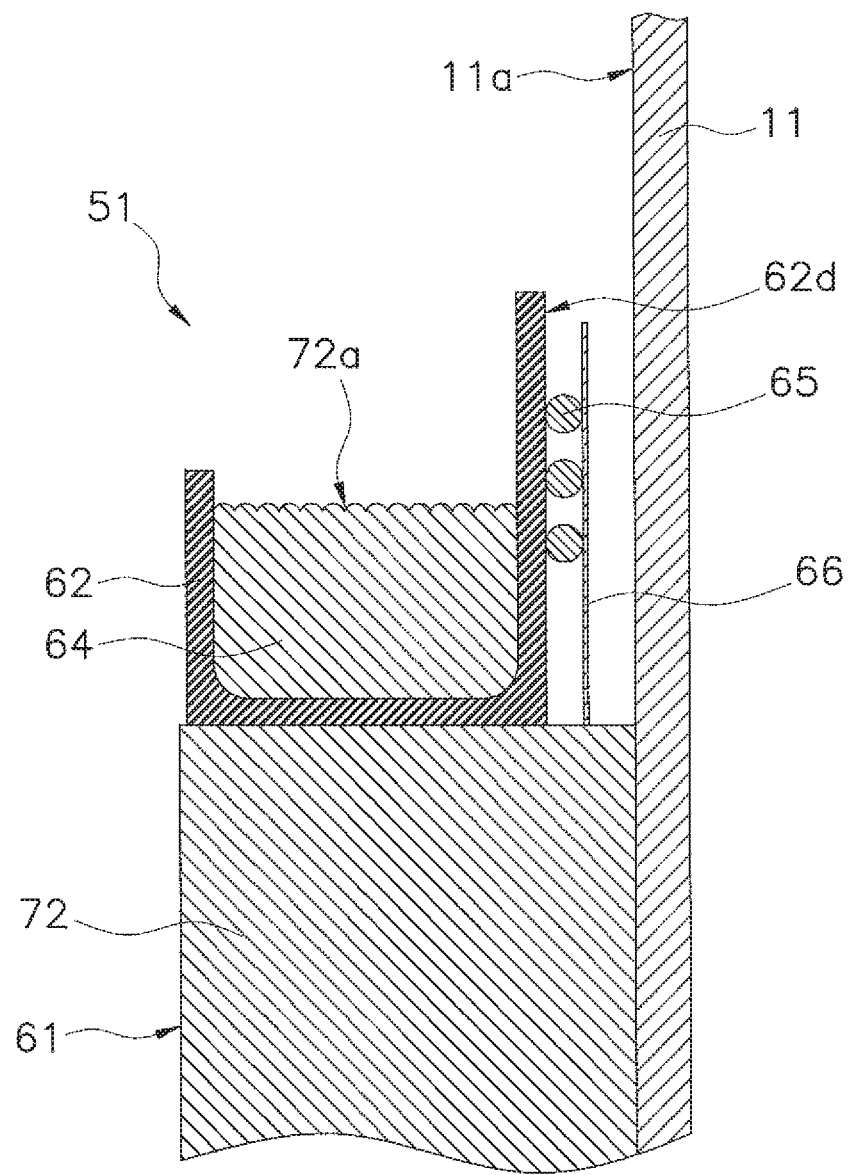
FIG. 6 is an enlarged view of the insulator shown in FIG. 4.

FIG. 6 is an enlarged view of the insulator 62 shown in FIG. 4. FIG. 6 also shows the barrel casing part 11 of the casing 10. As shown in FIG. 6, an outer peripheral surface 62d of the insulator 62 is in contact with the crossover wires 65. An insulation sheet 66 is arranged between the outer peripheral surface 62d of the insulator 62 and an inner peripheral surface 11a of the barrel casing part 11. The crossover wires 65 are positioned between the insulation sheet 66 and the outer peripheral surface 62d of the insulator 62. Specifically, the insulation sheet 66 is arranged between the crossover wires 65 and the casing 10, preventing electrical connection between the crossover wires 65 and the casing 10. FIG. 3 shows the crossover wires 65 and the insulation sheet 66 as hatched regions.

Figure 7:
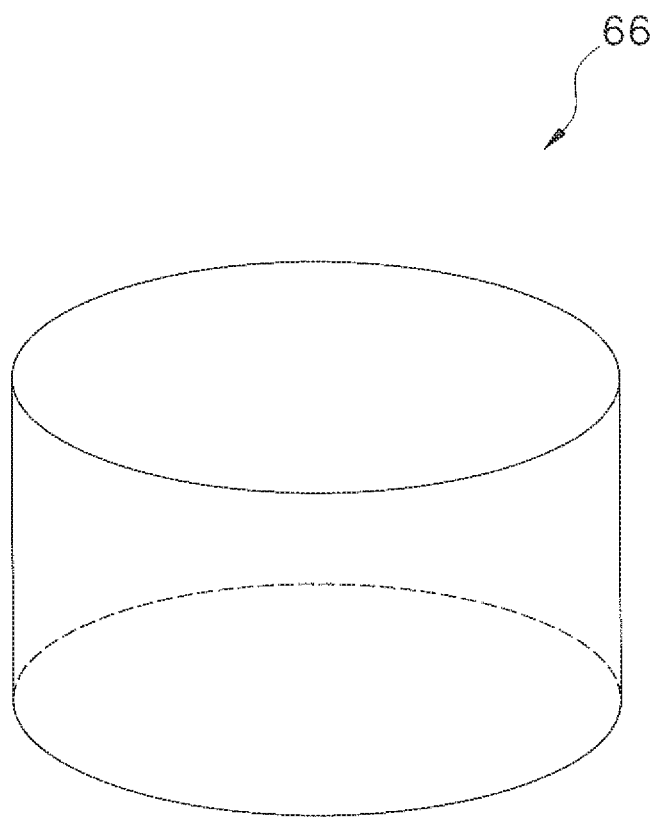
FIG. 7 is a schematic view of an insulation sheet.

FIG. 7 is an outline view of the insulation sheet 66. The insulation sheet 66 is tubular in shape. The material constituting the insulation sheet 66 is an insulating body made of resin, etc. For example, the insulation sheet 66 is produced by forming a rectangular resin film into a rounded configuration and molding the film into a tubular shape. The resin film is, e.g., 0.1-1.0 mm thick. The diameter of the tubular shape of the insulation sheet 66 is set between the diameter of the outer peripheral surface 62d of the insulator 62 and the diameter of the inner peripheral surface 11a of the barrel casing part 11. In this case, inserting the tubular insulation sheet 66 into the gap between the outer peripheral surface 62d of the insulator 62 and the inner peripheral surface 11a of the barrel part casing 11 from above the insulator 62 makes it possible to arrange the insulation sheet 66 between the crossover wires 65 and the casing 10.

The insulation sheet 66 is arranged between the casing 10 and the insulator 62 attached to the upper-side end surface of the stator core 61; however, in cases in which the crossover wires 65 are arranged below the stator core 61, the insulation sheet 66 may be arranged between the casing 10 and the insulator 63 attached to the lower-side end surface of the stator core 61.

(2-2) Rotor

The rotor 52 is linked to the crankshaft 17, which passes vertically through the rotational center of the rotor 52. The rotor 52 is connected to the compression mechanism 15 with the crankshaft 17 interposed therebetween. The rotor 52 has a rotor core 52a configured from a plurality of metal plates that are stacked in the vertical direction, and a plurality of magnets 52b embedded in the rotor core 52a, as shown in FIG. 1. The magnets 52b are disposed at equal intervals along the circumferential direction of the rotor core 52a.

(3) Operation of Compressor

Driving of the drive motor 16 causes the rotor 52 to rotate and the crankshaft 17 to axially rotate. Due to the axial rotation of the crankshaft 17, the piston 21 of the compression mechanism 15 performs an orbiting motion in the compression chamber 40 about the rotational axis of the crankshaft 17. The orbiting motion of the piston 21 causes the volumes of the intake chamber and discharge chamber constituting the compression chamber 40 to vary. A low-pressure gas refrigerant is thereby taken into the intake chamber of the compression chamber 40 from the intake tube 19. The volume of the intake chamber is reduced by the orbiting motion of the piston 21; as a result, the refrigerant is compressed, and the intake chamber becomes a discharge chamber. The compressed, high-pressure gas refrigerant is discharged from the discharge chamber into the high-pressure space S1. The discharged compressed refrigerant passes vertically upward through the air gap, which is the space between the stator 51 and the rotor 52. The compressed refrigerant is then discharged outside the casing 10 from the discharge tube 20. The refrigerant compressed by the rotary compressor 101 is, e.g., R410A, R22, R32, or carbon dioxide.

The lubricating oil that has accumulated in the oil reservoir part 10a at the bottom of the casing 10 is supplied to sliding parts of the compression mechanism 15, etc. The lubricating oil supplied to the sliding parts of the compression mechanism 15 flows into the compression chamber 40. In the compression chamber 40, the lubricating oil is formed into fine oil droplets that are mixed into the refrigerant gas. Therefore, the compressed refrigerant discharged from the compression mechanism 15 includes the lubricating oil. Some of the lubricating oil included in the compressed refrigerant separates from the refrigerant due to centrifugal force or the like caused by the flow of the refrigerant in the high-pressure space S1 above the drive motor 16, and adheres to the inner peripheral surface of the casing 10. The lubricating oil that has adhered to the inner peripheral surface of the casing 10 descends along the inner peripheral surface of the casing 10, and reaches a position at the height of the upper surface of the stator 51 of the drive motor 16. The lubricating oil then descends through the core cuts 73 of the stator core 61. The lubricating oil that has descended through the core cuts 73 finally returns to the oil reservoir part 10a.

(4) Features

The rotary compressor 101 comprises the drive motor 16 having the concentrated-winding coils. The windings 64 of each of the coils 72a are connected to each other via the crossover wires 65. The crossover wires 65 are arranged so as to be wound about the insulator 62, which is positioned above the stator 51, while in contact with the outer peripheral surface 62d of the insulator 62.

The insulation sheet 66 is arranged between the crossover wires 65 and the barrel casing part 11 of the casing 10. The tubular insulation sheet 66 is arranged by insertion between the outer peripheral surface 62d of the insulator 62 and the inner peripheral surface 11a of the barrel casing part 11. The insulation sheet 66 is an insulation member for preventing electrical connection between the crossover wires 65 and the casing 10.

In cases in which no insulation sheet 66 is arranged, the distance between the crossover wires 65 and the casing 10 must be set equal to or greater than a legally stipulated distance, in order to suitably insulate the crossover wires 65 and the casing 10 from each other. In such a case, it is difficult to reduce the thickness of a back yoke, which is a toric portion on the outer side of the stator 51.

However, in the rotary compressor 101, arranging the insulation sheet 66 between the crossover wires 65 and the casing 10 makes it possible to reduce the distance between the crossover wires 65 and the casing 10. This makes it possible to reduce the thickness of the back yoke of the stator 51, and to make the drive motor 16 more compact. Specifically, using the insulation sheet 66 makes it possible to make the rotary compressor 101 more compact. Even when the insulation sheet 66 is molded from a thin insulation member, and the temperature of the insulation sheet 66 rises during operation of the rotary compressor 101, the insulation sheet 66 does not have a large quantity of heat. Therefore, the insulation sheet 66 exerts substantially no adverse effect on the operation of the drive motor 16. Accordingly, the rotary compressor 101 can be made more compact without reducing the efficiency of the drive motor 16.

Additionally, the insulation sheet 66 has a tubular shape having only a side surface, as shown in FIG. 7. Therefore, inserting the insulation sheet 66 into the gap between the outer peripheral surface 62d of the insulator 62 and the inner peripheral surface 11a of the barrel casing part 11 from above the insulator 62 makes it possible to arrange the insulation sheet 66 between the crossover wires 65 and the casing 10. Accordingly, since the insulation sheet 66 can readily be arranged, the rotary compressor 101 can be made more compact simply.

The insulation sheet 66 is preferably molded from a heat-shrinkable material. Specifically, the insulation sheet 66 is preferably molded from an insulating body having heat-shrinkage properties. In this case, heating and shrinking the tubular insulation sheet 66 after arranging the insulation sheet 66 by insertion between the crossover wires 65 and the casing 10 makes it possible to secure the insulation sheet 66 to the insulator 62. Accordingly, using the heat-shrinkable insulation sheet 66 makes it possible to readily secure the insulation sheet 66 to the drive motor 16.

(5) Modifications (5-1) Modification A

Figure 8:
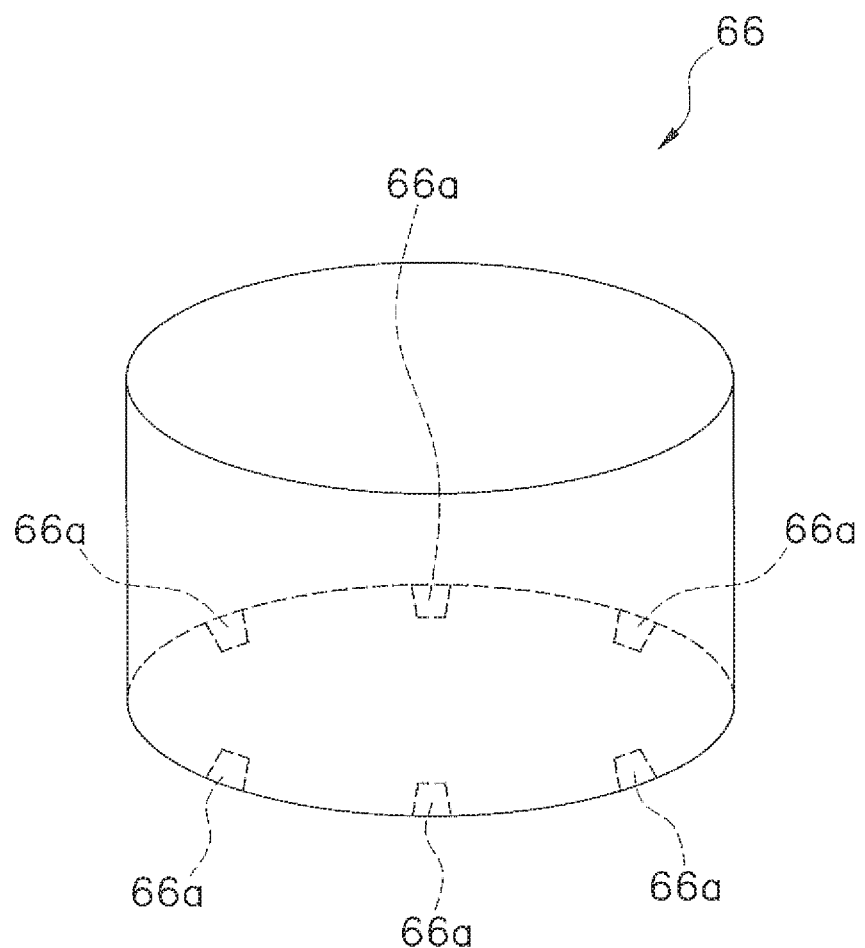
FIG. 8 is a schematic view of the insulation sheet according to modification A.
Figure 9:
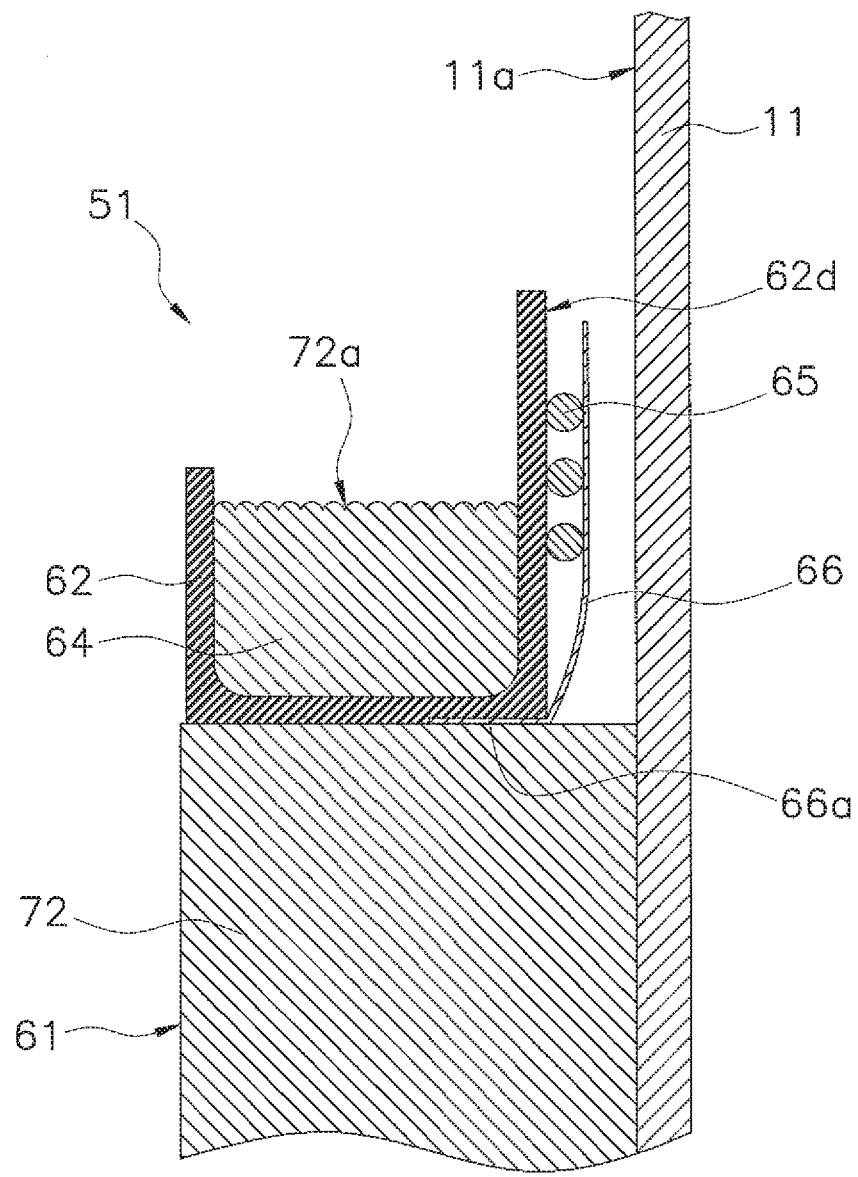
FIG. 9 is a cross-sectional view of the vicinity of the insulator according to modification A.

In the present embodiment, the insulation sheet 66 has a tubular shape having only a side surface, as shown in FIG. 7. FIG. 8 is an outline view of the insulation sheet 66 according to the present modification. As shown in FIG. 8, the insulation sheet 66 may be tubular in shape, and may have tabs 66a protruding from a lower end of the tubular shape. The tabs 66a of the insulation sheet 66 are portions sandwiched between the stator 51 and the insulator 62. FIG. 9 is a view that, in the present modification, corresponds to FIG. 6. FIG. 9 shows the insulation sheet 66 having the tabs 66a sandwiched between an upper-end surface of the stator 51 and a bottom surface of the insulator 62.

In the present modification, the insulation sheet 66 is arranged between the crossover wires 65 and the casing 10 while the tabs 66a of the insulation sheet 66 are inserted between the stator 51 and the insulator 62. Because the tabs 66a of the insulation sheet 66 are sandwiched between the stator 51 and the insulator 62, the tabs 66a prevent the insulation sheet 66 from separating from the stator 51. Accordingly, in the present modification, providing the tabs 66a to the insulation sheet 66 makes it possible to readily secure the insulation sheet 66 to the drive motor 16.

(5-2) Modification B

Figure 10:
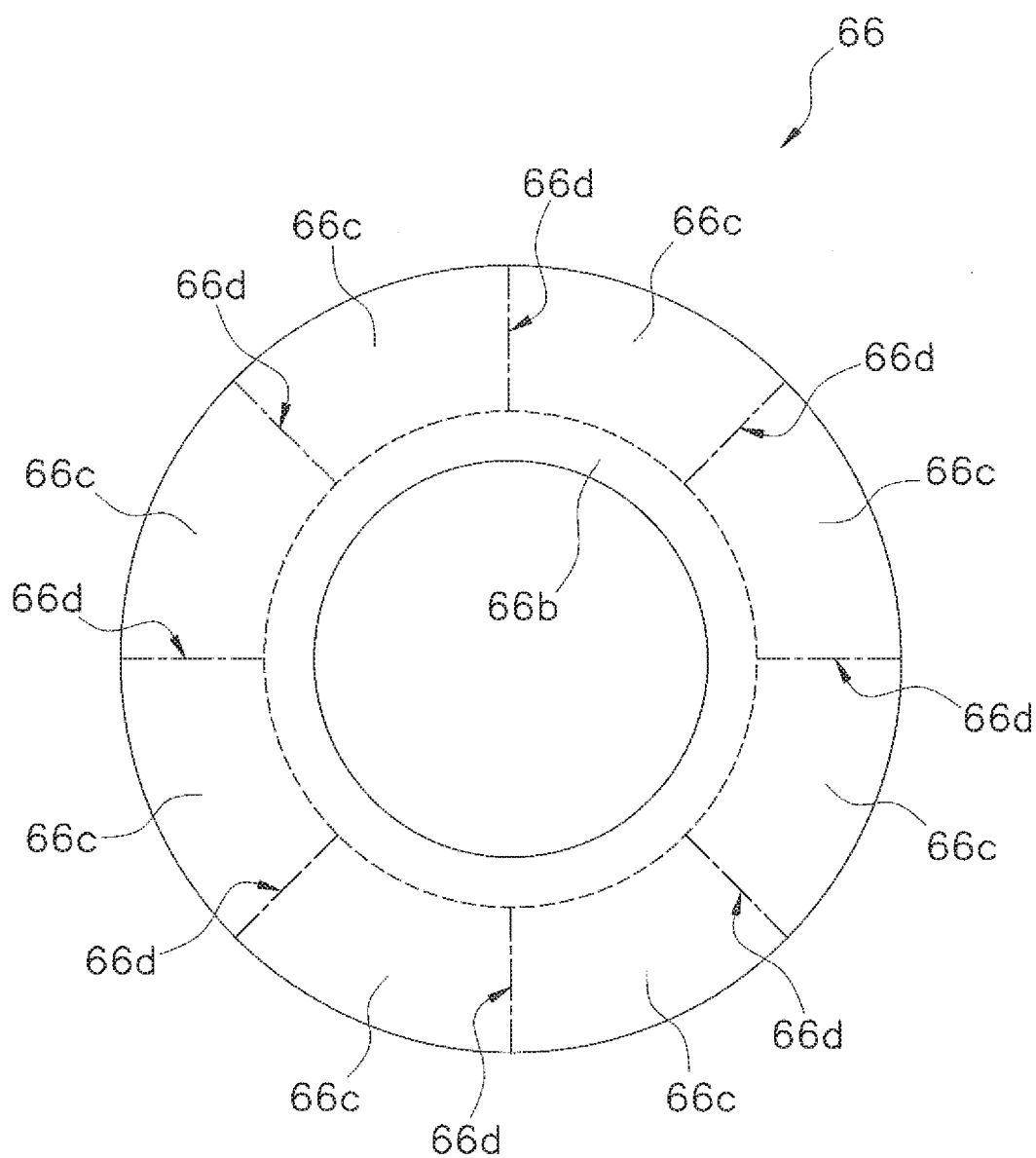
FIG. 10 is a schematic view of the insulation sheet according to modification B.
Figure 11:
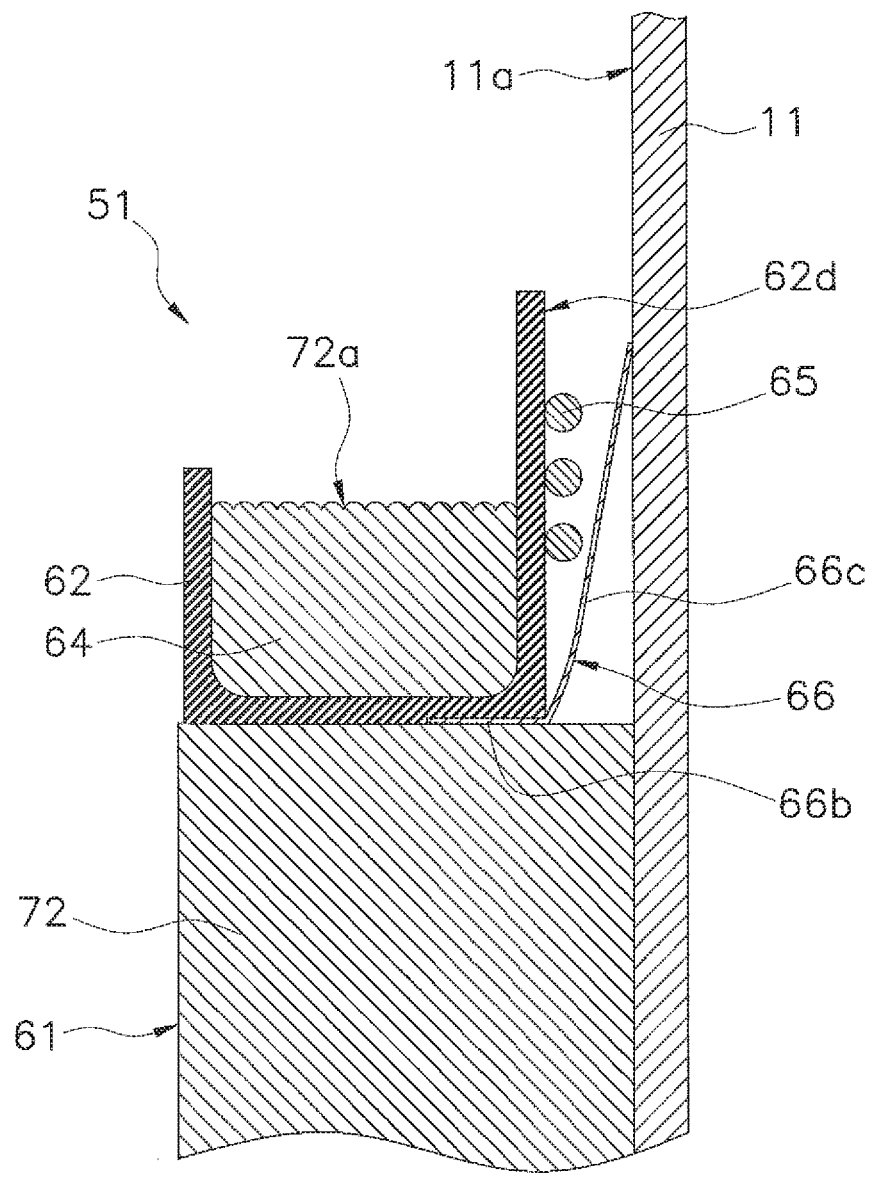
FIG. 11 is a cross-sectional view of the vicinity of the insulator according to modification B.

In the present embodiment, the insulation sheet 66 has a tubular shape having only a side surface, as shown in FIG. 7. FIG. 10 is an outline view of the insulation sheet 66 according to the present modification. As shown in FIG. 10, the insulation sheet 66 may have an annular part 66b sandwiched between the stator 51 and the insulator 62 along the entire circumference of the stator 51. FIG. 10 is a development view of the insulation sheet 66 before the insulation sheet 66 is attached to the stator 51. The insulation sheet 66 has the annular part 66b, and a plurality of projecting parts 66c protruding outward from the annular part 66b. As shown in FIG. 10, the projecting parts 66c may be formed by creating notches 66d along the radial direction of the annular part 66b, the notches being created in regions on the outer side of the annular part 66b. The notches 66d are provided at equal intervals along the circumferential direction of the annular part 66b. FIG. 11 is a view that, in the present modification, corresponds to FIG. 6. FIG. 11 shows the insulation sheet 66 having an annular part 66b sandwiched between an upper-end surface of the stator 51 and a bottom surface of the insulator 62.

In the present modification, the projecting parts 66c of the insulation sheet 66 are arranged between the crossover wires 65 and the casing 10 while the annular part 66b of the insulation sheet 66 is inserted between the stator 51 and the insulator 62, as shown in FIG. 11. The projecting parts 66c of the insulation sheet 66 are positioned between the crossover wires 65 and the casing 10. The projecting parts 66c stand upright with respect to the annular part 66b. Because the annular part 66b of the insulation sheet 66 is sandwiched between the stator 51 and the insulator 62, the annular part 66b prevents the insulation sheet 66 from separating from the stator 51. Accordingly, in the present modification, providing the annular part 66b and the projecting parts 66c to the insulation sheet 66 makes it possible to readily secure the insulation sheet 66 to the drive motor 16.

In the present modification, it is not necessary to form the notches 66d in the insulation sheet 66. Even in such a case, it is possible to secure the insulation sheet 66 to the drive motor 16 such that the annular part 66b is sandwiched between the stator 51 and the insulator 62, and such that the projecting parts 66c are arranged between the crossover wires 65 and the casing 10.

(5-3) Modification C

Figure 12:
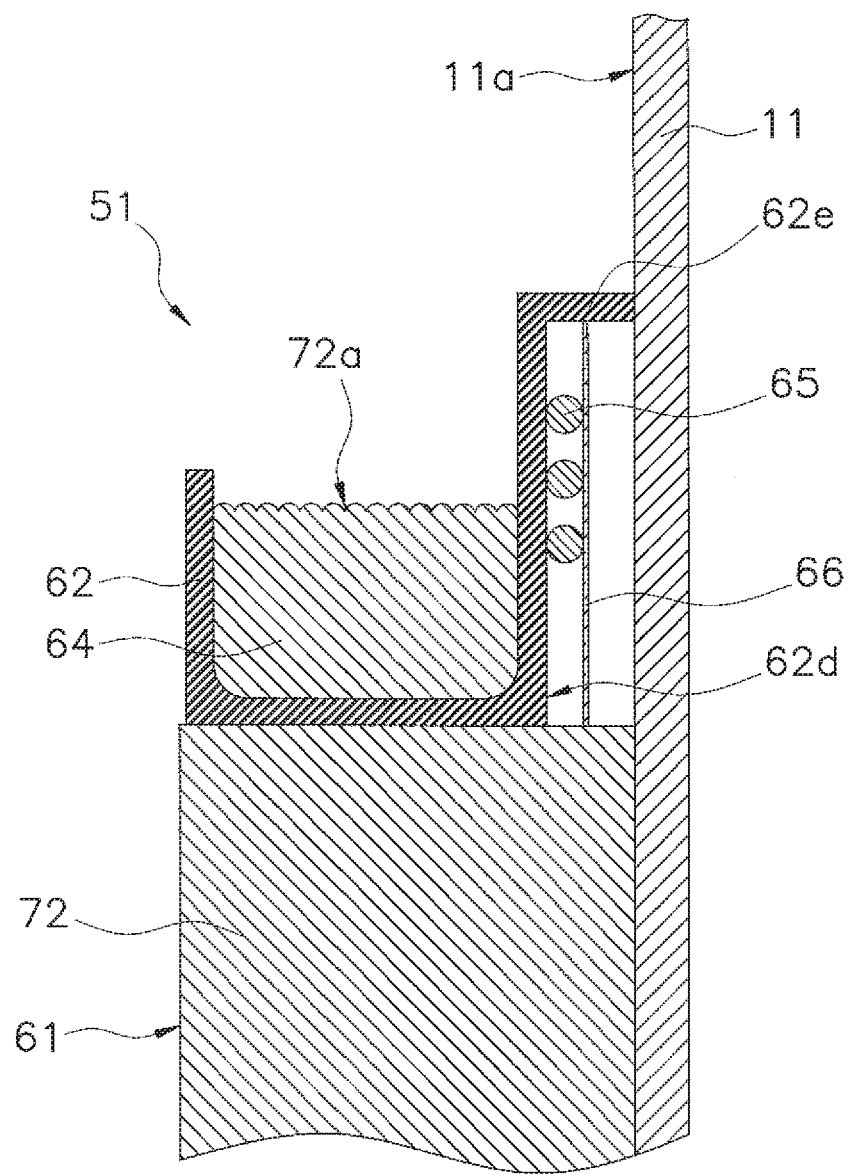
FIG. 12 is a cross-sectional view of the vicinity of the insulator according to modification C.

In the present embodiment, the insulation sheet 66 is arranged between the insulator 62 and the barrel casing part 11 of the casing 10. FIG. 12 is a view that, in the present modification, corresponds to FIG. 6. As shown in FIG. 12, the insulator 62 may have a protruding part 62e protruding toward the inner peripheral surface 11a of the barrel casing part 11. The insulation sheet 66 is arranged between the insulator 62 and the barrel casing part 11, and also between the stator 51 and the protruding part 62e.

In the present modification, the insulation sheet 66 is arranged between the insulator 62 and the barrel casing part 11. As shown in FIG. 12, the insulation sheet 66 is arranged below the protruding part 62e of the insulator 62, and above the upper-end surface of the stator 51. The protruding part 62e of the insulator 62 prevents the insulation sheet 66 from falling out of the gap between the insulator 62 and the barrel casing part 11. Accordingly, in the present modification, the insulation sheet 66 can be effectively prevented from separating from the drive motor 16.

(5-4) Modification D

Figure 13:
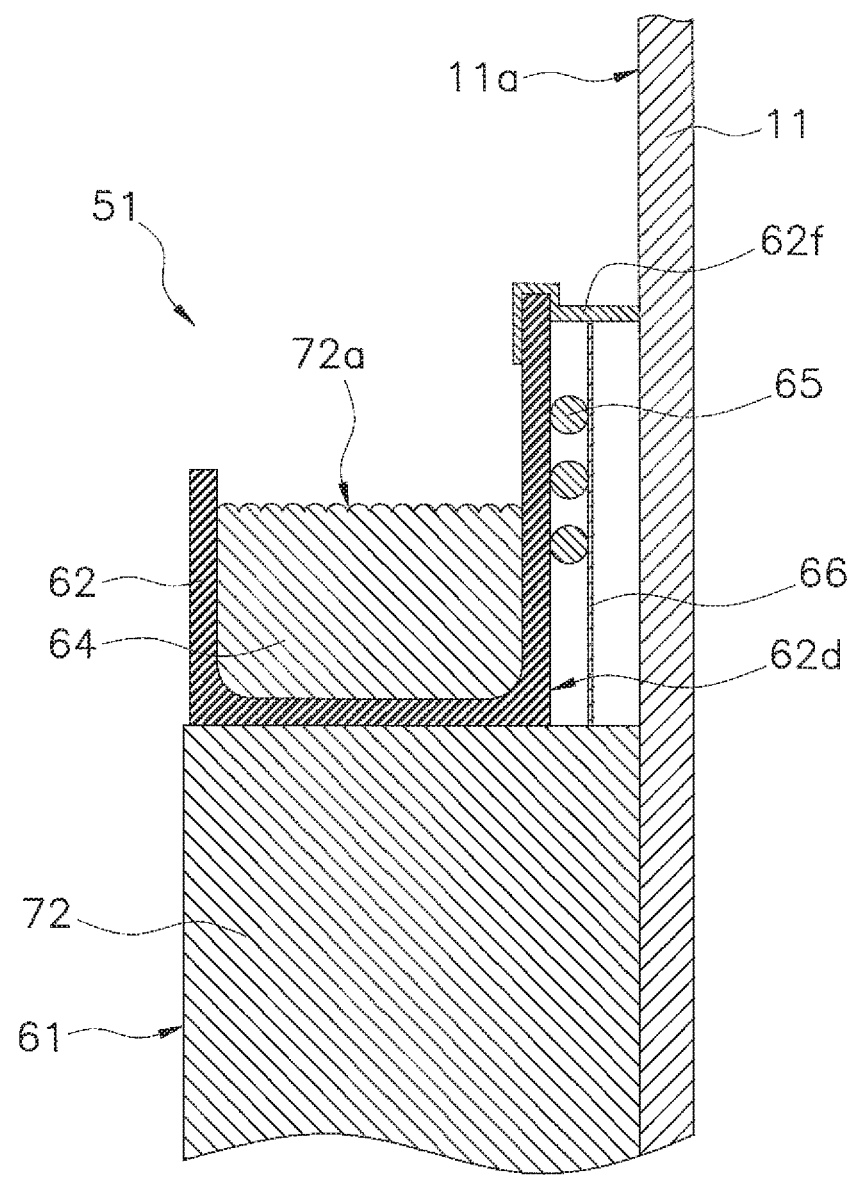
FIG. 13 is a cross-sectional view of the vicinity of the insulator according to modification D.

In the present embodiment, the insulation sheet 66 is arranged between the insulator 62 and the barrel casing part 11 of the casing 10. FIG. 13 is a view that, in the present modification, corresponds to FIG. 6. As shown in FIG. 13, a sheet-securing member 62f may be arranged between the insulator 62 and the barrel casing part 11. The sheet-securing member 62f is independent from the insulator 62. The sheet-securing member 62f may be capable of being attached to the insulator 62. The insulation sheet 66 is arranged between the insulator 62 and the barrel casing part 11, and also between the stator 51 and the sheet-securing member 62f.

In the present modification, the insulation sheet 66 is arranged between the insulator 62 and the barrel casing part 11. As shown in FIG. 13, the insulation sheet 66 is arranged below the sheet-securing member 62f and above the upper-end surface of the stator 51. The sheet-securing member 62f prevents the insulation sheet 66 from falling out of the gap between the insulator 62 and the barrel casing part 11. Accordingly, in the present modification, the insulation sheet 66 can be effectively prevented from separating from the drive motor 16.

(5-5) Modification E

In the present embodiment, the insulation sheet 66 is configured from a single sheet; however, the insulation sheet 66 may instead be configured from a plurality of sheets. For example, the insulation sheet 66 may be arranged such that a plurality of film-form insulation members constituting the insulation sheet 66 are inserted into a gap between the crossover wires 65 and the casing 10 from above the insulator 62, and the crossover wires 65 are insulated from the casing 10 through the entirety of the gap.

(5-6) Modification F

In the present embodiment, the rotary compressor 101 is used as a compressor comprising the drive motor 16 in which the insulation sheet 66 is arranged between the crossover wires 65 and the casing 10; however, a scroll compressor and a reciprocating compressor, etc., may be used instead.

Additionally, in the present embodiment, the drive motor 16 has concentrated-winding coils; however, distributed-winding coils in which coil windings are wound across a plurality of the teeth 72 may be used instead.

INDUSTRIAL APPLICABILITY

The compressor according to the present invention can be made more compact while ensuring the efficiency of the motor.

What is claimed is:

1. A compressor comprising:
a casing;
a compression mechanism arranged inside the casing; and
a motor arranged inside the casing, the motor driving the compression mechanism, the motor being a concentrated-winding motor having a stator that has a plurality of teeth, and an insulator adjacent to the stator, with windings being wound about the teeth with the insulator interposed therebetween; and
an insulation sheet arranged between the casing and crossover wires of the windings,
the insulation sheet being tubular in shape, and being arranged between the insulator and the casing, and
the insulation sheet having tabs sandwiched between the stator and the insulator.

2. The compressor according to claim 1, wherein
the insulation sheet is molded from a heat-shrinkable material.

3. A compressor comprising:
a casing;
a compression mechanism arranged inside the casing;
a motor arranged inside the casing, the motor driving the compression mechanism, the motor being a concentrated-winding motor having a stator that has a plurality of teeth, and an insulator adjacent to the stator, with windings being wound about the teeth with the insulator interposed therebetween; and
an insulation sheet arranged between the casing and crossover wires of the windings,
the insulation sheet being arranged between the insulator and the casing, and
the insulation sheet having an annular part sandwiched between the stator and the insulator across an entire circumference of the stator.

4. A compressor comprising:
a casing;
a compression mechanism arranged inside the casing;
a motor arranged inside the casing, the motor driving the compression mechanism, the motor being a concentrated-winding motor having a stator that has a plurality of teeth, and an insulator adjacent to the stator, with windings being wound about the teeth with the insulator interposed therebetween; and
an insulation sheet arranged between the casing and crossover wires of the windings,
the insulator having a protruding part protruding toward the casing, and
the insulation sheet being arranged between the insulator and the casing, and the insulation sheet being arranged between the stator and the protruding part.

5. A compressor comprising:
a casing;
a compression mechanism arranged inside the casing;
a motor arranged inside the casing, the motor driving the compression mechanism, the motor being a concentrated-winding motor having a stator that has a plurality of teeth, and an insulator adjacent to the stator, with windings being wound about the teeth with the insulator interposed therebetween;
an insulation sheet arranged between the casing and crossover wires of the windings; and
a sheet-securing member arranged between the insulator and the casing,
the insulation sheet being arranged between the insulator and the casing, and the insulation sheet being arranged between the stator and the sheet-securing member.

* * * * *